United States Patent [19]
Barnum et al.

[11] Patent Number: 5,240,040
[45] Date of Patent: Aug. 31, 1993

[54] MIXING VALVE

[75] Inventors: Thomas G. Barnum, Fox Point; Jeffery S. Jaworski, Menomonee Falls, both of Wis.

[73] Assignee: Bradley Corporation, Menomonee Falls, Wis.

[21] Appl. No.: 931,918

[22] Filed: Aug. 18, 1992

[51] Int. Cl.5 .......................................... F16K 11/044
[52] U.S. Cl. ...................................... 137/607; 137/541
[58] Field of Search .................. 137/607, 636, 636.1, 137/541, 513

[56] References Cited

U.S. PATENT DOCUMENTS

| 956,860 | 5/1910 | Lawler | 137/607 |
|---|---|---|---|
| 1,371,795 | 3/1921 | Logan | 137/607 X |
| 1,840,961 | 1/1932 | Kuenzler | 137/607 X |
| 2,045,308 | 6/1936 | Wolff | 137/607 |
| 2,415,466 | 2/1947 | Curtis | 137/607 |
| 2,519,448 | 8/1950 | Fairchild | 137/636.1 |
| 2,614,851 | 10/1952 | Parker | . |
| 2,980,140 | 4/1961 | McMillan | . |
| 2,995,148 | 8/1961 | Novak et al. | . |
| 2,997,063 | 8/1961 | Anderson et al. | . |
| 3,021,868 | 2/1962 | Kovach | 137/607 |
| 4,128,113 | 12/1978 | Hart | 137/607 |
| 4,129,145 | 12/1978 | Wynn | 137/541 |
| 4,398,560 | 8/1983 | Black | 137/607 |

FOREIGN PATENT DOCUMENTS

| 978632 | 4/1951 | France | 137/607 |
|---|---|---|---|
| 27652 | 12/1904 | United Kingdom | 137/607 |
| 592607 | 9/1947 | United Kingdom | 137/625.5 |

*Primary Examiner*—Stephen M. Hepperle
*Attorney, Agent, or Firm*—Foley & Lardner

[57] ABSTRACT

A mixing valve according to the invention allows fluids such as hot and cold water to flow through a pair of inlet ports, mix together and then exit through an outlet port. A check valve in each inlet allows the incoming fluid to flow in a forward direction, but prevents any reverse or crossover flow. An adjustable stop, positioned intermediate the valves, regulates the extent to which each valve can open to provide a desired mixing ratio of fluids, and can also be used to close one of the check valves. An actuator connected to the adjustable stop permits manual control of the mixing ratio.

12 Claims, 5 Drawing Sheets

MIXING VALVE

TECHNICAL FIELD

The present invention relates to a mixing valve that controls the mixing ratio of two incoming fluids, particularly to a 3-port mixing valve having two inlets and an outlet.

BACKGROUND OF THE INVENTION

Mixing valves are used to control the mixing ratio of two or more fluids, such as hot and cold water, that flow into the mixing valve, so that the exiting fluid is a desired mixture of the incoming fluids. The mixing valve has a pair of inlets to which the hot and cold water supplies are attached. The desired amounts of hot water and cold water merge within the mixing valve to produce water of the desired temperature, which then exits the valve through an outlet. In Parker, U.S. Pat. No. 2,614,851, for example, mixing is controlled by a manually-actuable cam that engages each of the inlet valves.

Known mixing valves have a limited ability to prevent fluid backflow or crossover flow between the inlets. The present invention addresses this drawback.

SUMMARY OF THE INVENTION

A mixing valve according to the invention includes a housing having a first inlet port, a second inlet port, and an outlet port in communication with the inlet ports. A pair of check valves are disposed in each of the inlet ports. Each check valve has a biasing mechanism that biases it to a closed position. The check valves open in response to sufficient forward fluid pressure at the associated inlet. An adjustable stop controls the maximum extent to which each check valve can open, and an actuator is used to change the position of the adjustable stop in a manner effective to vary the mixing ratio of fluids entering the inlets, mixing within the housing, and leaving through the outlet.

In a preferred embodiment, the adjustable stop comprises a slider having its ends mounted in each inlet inwardly of the check valves. The ends of the slider limit the maximum extent to which each check valve can open, and the actuator is used to manually move the slider lengthwise towards one check valve and away from the other, changing the mixing ratio in favor of the fluid entering through the check valve the slider moved away from. Such a mixing ratio is achieved whenever there is sufficient pressure in each inlet to force the check valves fully open.

In this manner the invention provides control of the mixing ratio, and also prevents reverse or crossover flow between inlets. Under conditions of insufficient forward fluid flow, no fluid flow, or reverse fluid flow at an inlet port, the associated check valve closes. However, under conditions of increasing forward fluid flow, the check valve moves towards its fully open position, allowing increasing amounts of fluid flow.

BRIEF DESCRIPTION OF THE DRAWINGS

The invention will hereafter be described with reference to the accompanying drawing, wherein like numerals denote like elements, and.

DETAILED DESCRIPTION OF PREFERRED EMBODIMENTS

Figure 1:
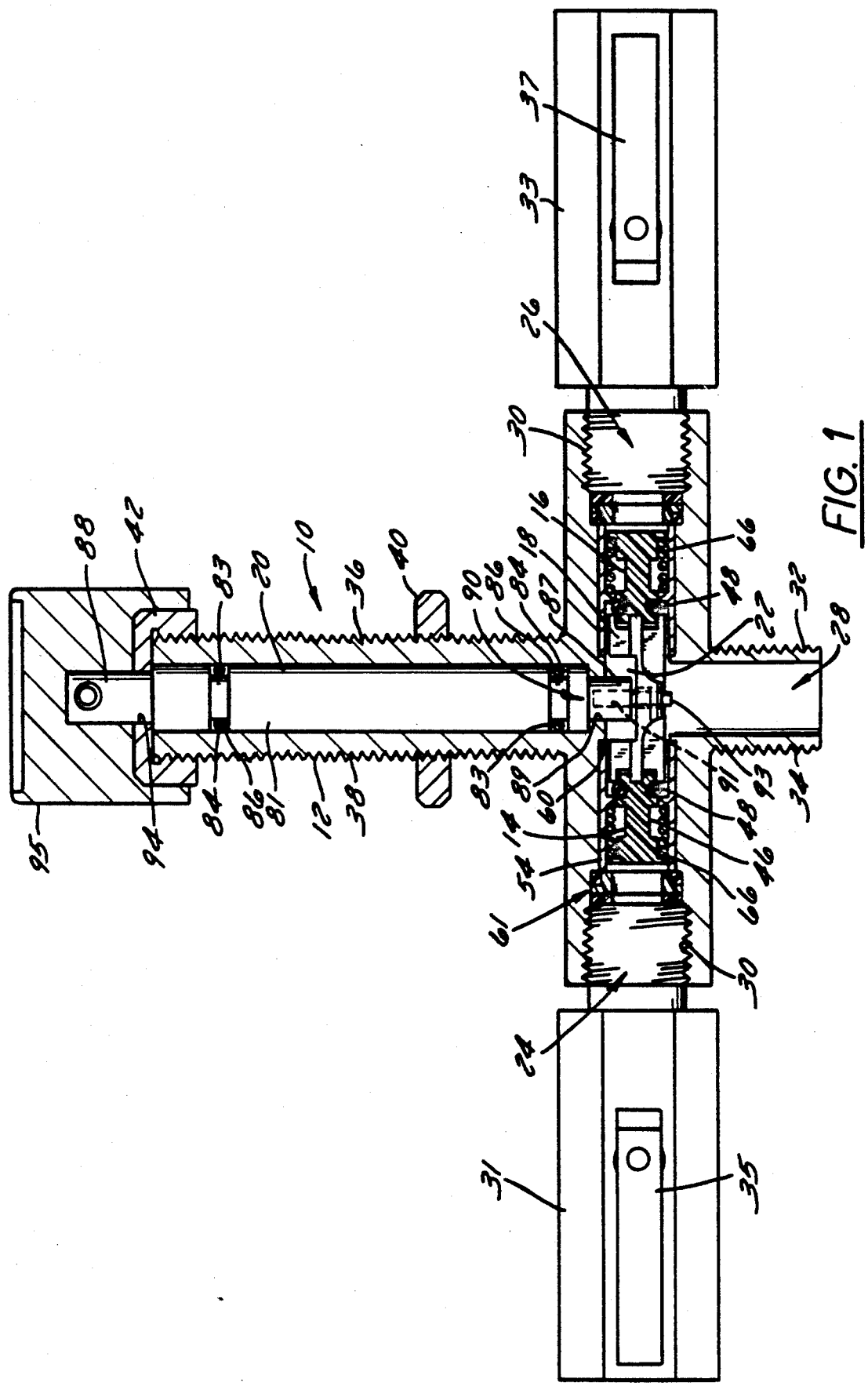
FIG. 1 is a cross-sectional view of a mixing valve assembly according to the invention in a position allowing approximately equal flow of fluids through each check valve.
Figure 2:
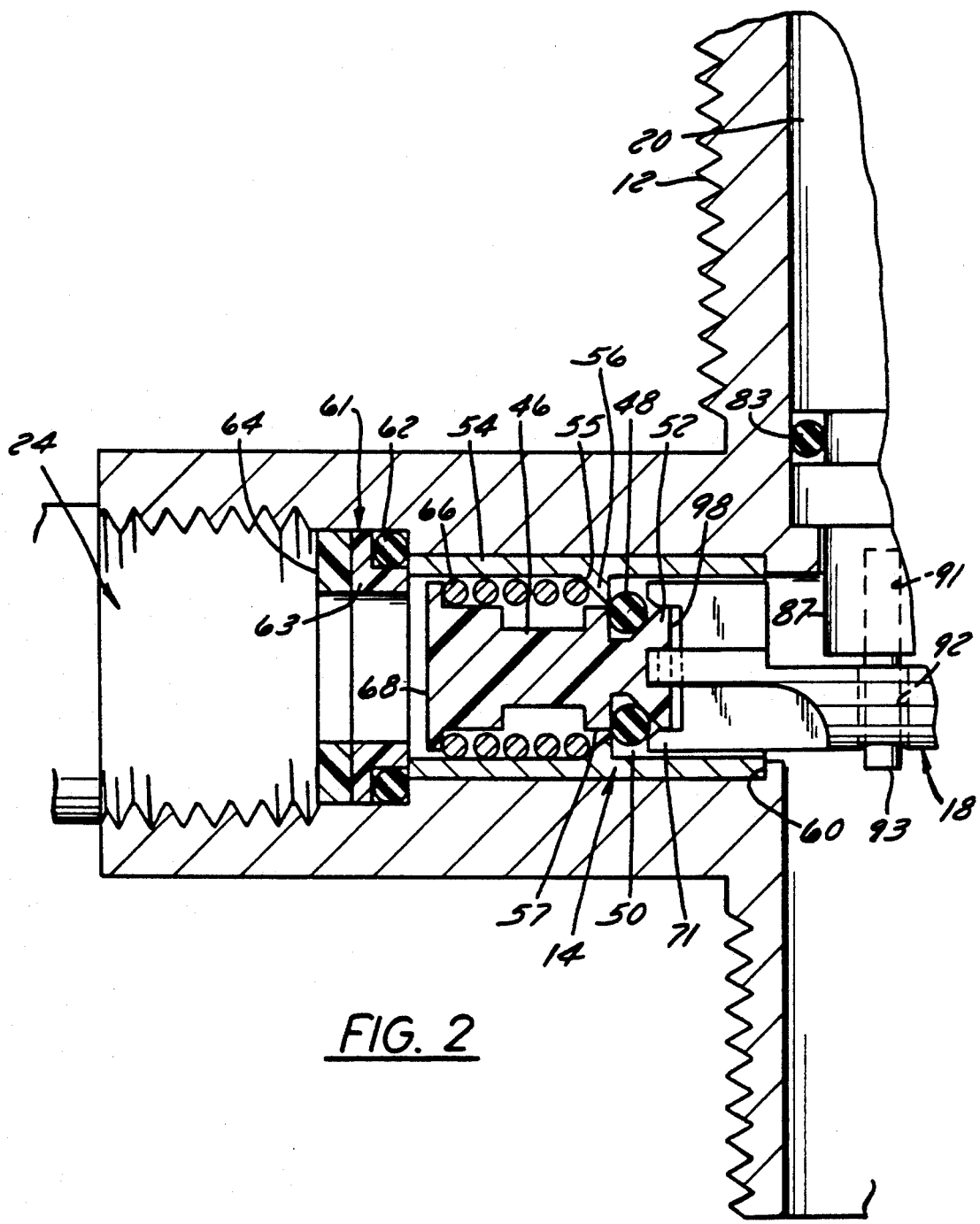
FIG. 2 is an enlarged, partial view of the check valve on the left side of FIG. 1.
Figure 3:
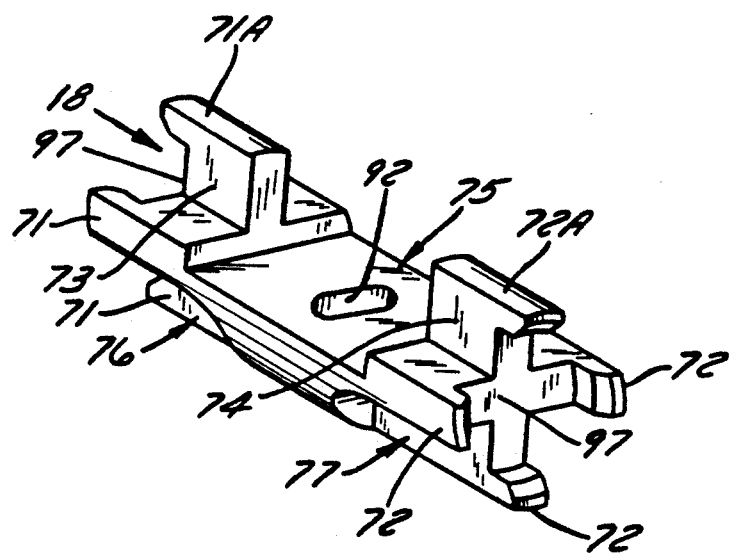
FIG. 3 is a perspective view of the slider shown in FIGS. 1 and 2.
Figure 4:
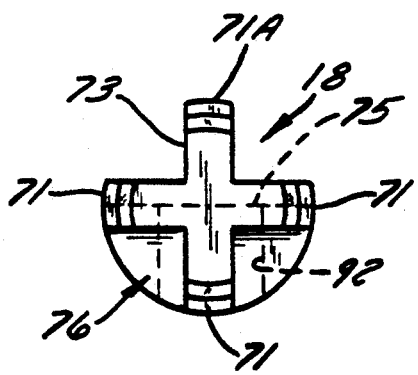
FIG. 4 is an end view of the slider of FIG. 3.
Figure 5:
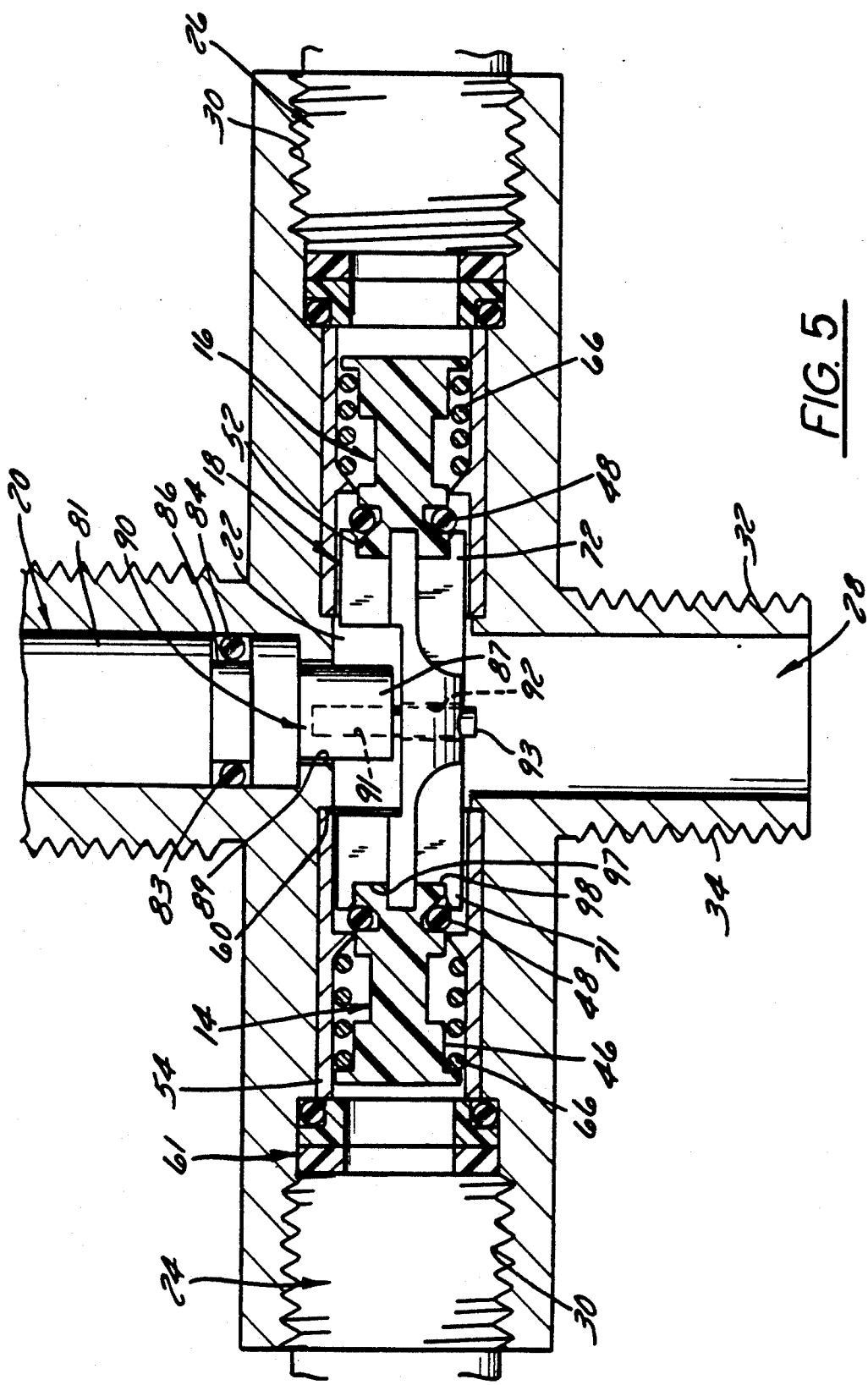
FIG. 5 is a view similar to FIG. 1, under forward flow conditions and showing the slider shifted to the left.

Referring now to FIGS. 1 and 2, a mixing valve 10 of the invention includes a generally cross-shaped housing 12, a first check valve 14, a second check valve 16, a slider 18 that functions as an adjustable stop for regulating valves 14, 16, and an actuator 20 used to position slider 18. Housing 12 includes a pair of coaxial inlet ports 24, 26, an outlet port 28 forming a T-shaped passage with the inlets, and a central chamber 22 at which inlets 24, 26 merge with outlet 28. A fourth tubular opening adjoining chamber 22 on the side opposite outlet 28 is used to house actuator 20, as explained in detail below.

Inlet ports 24, 26 have threaded sockets or counterbores 30 for connecting valve assembly 10 to a pair of cold and hot water pipes 31, 33 provided with respective manual shut-off valves 35, 37 of conventional design. Outlet port 28 terminates at the end of a first tubular housing arm 32 having external threads 34 for coupling to an outlet pipe. A second tubular arm 36 having external threads 38 is preferably longer than first arm 32 and is provided with suitable means for mounting the valve 10 to a support. Such means may include, for example, a nut 40 threadedly mounted on threads 38 and a cap 42 mounted on threads 38 over the distal end of arm 36. Valve 10 may be mounted through a hole in a support fixture, such as a sink, by removing cap 42, inserting arm 36 through the hole, replacing cap 42, and tightening nut 40 to clamp the fixture between nut 40 and cap 42. A face plate (not shown) having hot and cold mixing gradations may be installed beneath cap 42.

First check valve 14 is disposed in first port 24 inwardly of socket 30. Check valve 14 includes a reciprocating plunger 46 mounted within a sleeve 54 that fits closely within inlet 24, and a spring 66 that biases plunger 46 towards a closed, retracted position. One such check valve is generally described in Wynn U.S. Pat. No. 4,129,145, the contents of which are incorporated by reference herein. Sleeve 54 is secured between a shoulder 60 that adjoins chamber 22 and a seal assembly 61 disposed at the inner end of counterbore 30. Seal assembly 61 may include an O-ring 62 disposed to engage the bottom corner of counterbore 30, a flanged backing ring 63, L-shaped in cross-section, that fits over and confines O-ring 62, and a washer 64 having the same inner and outer diameter as ring 63. Washer 64 engages the end of pipe 31 when pipe 31 is fully inserted into threaded socket 30. The inner end of the tubular axial portion of ring 63 engages and retains the outer end of sleeve 54.

Plunger 46 has a sealing member, such as an O-ring 48, disposed thereon in an annular slot 50 formed between a enlarged valve head 52 at the inner end of plunger 46 and an annular flange 57 extending radially from near the middle of plunger 46. O-ring 48 sealingly engages a valve seat 55, which preferably comprises an inwardly-facing sloped or vertical surface of an annular flange 56 that extends radially inwardly from the inside of sleeve 54. Coil spring 66 is disposed about plunger 46 for compression between an annular flange 68 at the outer end of plunger 46 and annular flange 56. Spring 66 engages flange 56 on the side opposite from O-ring 48, thereby biasing O-ring 48 against valve seat 55. Second check valve 16 is disposed in second port 26 and is substantially identical to first valve 14, except that it is mounted on the other side of slider 18 in the opposite orientation.

Slider 18, shown in FIGS. 1-4, is disposed between valves 14, 16 and extends across chamber 22 such that opposite ends of slider 18 are disposed in the inner ends of inlets 24 and 26. Each check valve 14, 16 is movable between a closed position and a fully open position that permits maximum forward (inward) fluid flow. Slider 18 selectively limits the extent to which check valves 14 and 16 can open, changing the maximum open position and maximum fluid flow. Slider 18 can also move to an extreme right or left position to hold either check valve in the closed position, even under forward flow conditions, effectively shutting off forward fluid flow on one side while permitting maximum flow on the other.

Slider 18 is generally cylindrical and has lengthwise fingers 71, 72 extending in opposite directions from each end. Fingers 71, 72 extend from the outer periphery of each end of slider 18 and are equally spaced from each other in a generally circular formation. The ends of fingers 71, 72 are in close proximity to the O-ring 48 of each of valves 14, 16, respectively. Most of the upper half of slider 18 is cut away, such that a top finger 71A, 72A on each end extends from an associated rectangular projection 73, 74. A trough-shaped space 75 between projections 73, 74 is open to allow connection of slider 18 to actuator 20, as described below. Slider 18 further has passages 76, 77 cut away from bottom end portions thereof for permitting water to flow from either of valves 14, 16 through slider 18 and into outlet port 28, where the hot and cold water streams mix.

Actuator 20 according to the invention includes a cylindrical stem 81 rotatably mounted within tubular arm 36 of housing 12 with a pair of upper and lower seals 83 to prevent leakage. Seals 83 may comprise, for example, elastomeric O-rings 84 mounted in annular peripheral grooves 86 of stem 81. Stem 81 has a pair of inner and outer end portions 87, 88 of reduced diameter. Inner end portion 87 fits through a retaining hole 89 adjoining chamber 22 and thereby extends into chamber 22.

A translation mechanism 90, such as a pin-and-groove cranking device or similar device that transforms rotary movement to linear movement, translates rotation of stem 81 into lengthwise movement of slider 18. Inner end 87 of stem 81 has a lengthwise hole 91 therein that is offset from the central lengthwise axis of stem 81. Slider 18 has a central groove 92 therein which is elongated in the widthwise direction of slider 18. A connector pin 93 is press-fitted or otherwise secured in hole 91 and slidably inserted into groove 92. Outer end portion 88 of stem 81 extends through a central hole 94 in cap 42 and has a handle 95 secured thereto.

Rotating handle 95 of actuator 20 causes stem 81 to rotate. At the same time, pin 93 moves along a circular path about the lengthwise axis of stem 81. The inner end of pin 93 disposed in groove 92 thereby moves slider 18 towards valve 14 and away from valve 16, or the reverse. Pin 93 also slides along groove 92 in the widthwise direction of slider 18.

The resulting position of slider 18 determines the extent to which valves 14, 16 can open. During sufficient fluid flow in first and second ports 24 and 26, check valves 14, 16 are forced open until flat end walls 97 of slider 18 inwardly of fingers 71, 72 engage a flat inner end 98 of valve head 52 in order to limit movement of plunger 46. Fingers 71, 72 prevent O-rings 48 from being stripped off of valve head 52 by forward fluid pressure. If slider 18 is in its center position, valves 14, 16 can open to an equal extent, providing equal mixing. If slider 18 is closer to valve 14, the O-ring 48 associated with valve 14 comes into contact with fingers 71 sooner than the O-ring 48 associated with valve 16 comes into contact with fingers 72. This alters the mixing ratio in favor of water from the cold water supply when valves 14, 16 are each fully open.

If forward fluid flow in either of ports 24 or 26 ceases or drops below a predetermined minimum pressure level, spring 66 forces plunger 46 rearwardly in the reverse flow direction and closes the associated valve 14 or 16. This prevents crossover flow or reverse flow through either of check valves 14, 16. Such reverse or crossover flow itself will also tend to force valve head 52 and O-ring 48 backwards, aiding in closing the valve.

Figure 6:
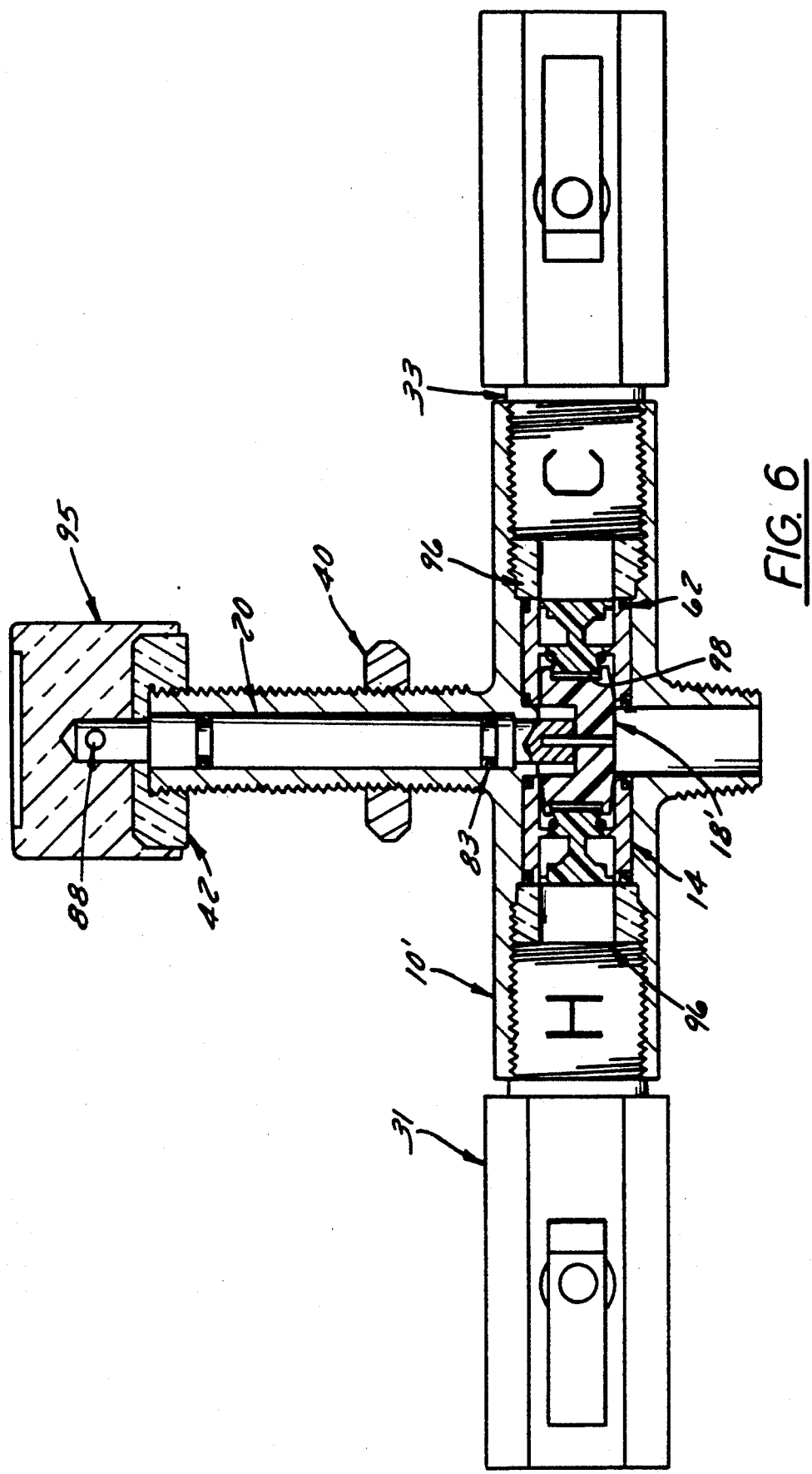
FIG. 6 is a cross-sectional view of an alternative embodiment of a mixing valve assembly according to the invention.

In the alternative embodiment shown in FIG. 6 of a modified valve 10', threaded sleeves 96 replace seal assemblies 61, and a modified slider 18' has rounded, tapered ends that can permit greater ease of assembly and enhanced fluid flow past slider 18'. Valves 10, 10' of the invention control mixing but do not provide any means for shutting the outlet water flow on and off. As such, the mixing valve of the invention is best used together with a downstream on-off valve. In an institutional-size washing basin of the type wherein several persons can wash their hands at once, a large foot pedal or similar device is used to turn the water flow on and off, and a valve 10 or 10' of the invention is used to keep water flow at a desired constant temperature.

It will be understood that the foregoing description is of preferred exemplary embodiments of this invention, and that the invention is not limited to the specific forms shown. For example, pin 93 may be formed as an integral part of stem 81. Various materials such as brass, steel or plastic may be used to form the different valve components, different types of known one-way valves can be used, the actuator may be electro-mechanical, and different configurations may be used for the slider, check valve bodies, etc. These and other modifications may be made in the design and arrangement of the elements without departing from the scope of the invention as expressed in the appended claims.

What is claimed is:

1. A mixing valve, comprising:
   a housing having a first inlet port, a second inlet port, and an outlet port in communication with the inlet ports;
   a pair of check valves disposed in each of the inlet ports, which check valves have a biasing spring in continuous contact therewith that biases each check valve to a closed position, and which check valves open in response to sufficient forward fluid pressure at the inlets;
   an adjustable stop that controls the maximum extent to which each check valve can open; and
   an actuator for changing the position of the adjustable stop in a manner effective to vary the mixing ratio of fluids entering the inlets, mixing within the housing, and leaving through the outlet.

2. A mixing valve, comprising:
a housing having a first inlet port, a second inlet port, and an outlet port in communication with the inlet ports;
a pair of check valves disposed in each of the inlet ports, which check valves have a biasing mechanism that biases each check valve to a closed position, and which check valves open in response to sufficient forward fluid pressure at the inlets;
an adjustable stop that controls the maximum extent to which each check valve can open;
an actuator for changing the position of the adjustable stop in a manner effective to vary the mixing ratio of fluids entering the inlets, mixing within the housing, and leaving through the outlet; and
wherein the adjustable stop comprises a unitary slider interposed between the check valves and having its opposite ends slidably disposed in each of the inlets for contact with each check valve, whereby lengthwise movement of the slider decreases the extent to which one check valve can open while increasing the extent to which the other check valve can open.

3. The mixing valve of claim 2, wherein the actuator includes a rotatable stem having a handle mounted at its outer end outside of the housing and having a translation mechanism connected to its inner end within the housing, which translation mechanism translates rotation of the stem into lengthwise sliding movement of the slider.

4. The mixing valve of claim 3, wherein the translation mechanism comprises a pin that extends from an inner end of the stem into a groove in the slider, which pin is rigidly secured to the stem and extends in the lengthwise direction thereof at a position parallel to but offset from a central lengthwise axis of the stem, such that rotation of the stem causes the pin to move in a circular path, and the groove in the slider is elongated in the widthwise direction of the slider, so that rotation of the stem causes lengthwise movement of the slider in unison with the pin and widthwise sliding movement of the pin in the elongated groove.

5. The mixing valve of claim 2, wherein each check valve comprises a sleeve fitted into each inlet port, a valve seat formed of the sleeve, and a valve body including a plunger and a sealing member mounted on the plunger, which sealing member engages the valve seat when the valve is closed, and a biasing mechanism that biases the check valve to its closed position, and wherein the slider has one or more fingers extending from its ends which engage the valve body in order to limit the extent to which the check valve can open.

6. The mixing valve of claim 5, wherein the sealing member comprises an O-ring fitted into an annular groove at the front of the plunger, the valve seat comprises a inwardly-facing surface of an annular flange that extends radially-inwardly from the sleeve, and the slider has lengthwise fingers extending from its ends which engage each O-ring when the associated check valve is open.

7. The mixing valve of claim 6, wherein the biasing mechanism comprises a coil spring held under compression between a outwardly facing surface of the annular flange of the sleeve and an inwardly facing surface of a further annular flange that extends radially outwardly from the plunger.

8. The mixing valve of claim 2, wherein the inlet ports are coaxially disposed on opposite sides of the valve.

9. The mixing valve of claim 2, wherein the housing is generally cross-shaped and comprises four arms, the inlets and outlet together defining a T-shaped passage within three of the arms, and the actuator being disposed in the fourth arm.

10. The mixing valve of claim 9, wherein the inlet ports have internal threads located outwardly of the check valves for coupling each inlet to a water supply pipe.

11. The mixing valve of claim 9, further comprising means for mounting the valve by its fourth arm to a supporting fixture.

12. A mixing valve for controlling the mixing ratio of a pair of incoming fluids, comprising:
a housing having a first inlet port, a second inlet port, and an outlet port in communication with the inlet ports;
a first check valve disposed in the first inlet port, the first check valve having a valve body movable between a closed position and a fully open position, means for reverse biasing the first check valve to its closed position against the direction of forward fluid flow into the first inlet so that under conditions of insufficient forward fluid flow, no fluid flow, or reverse fluid flow at the first check valve, the first check valve closes, and under conditions of increasing forward fluid pressure at the first inlet port, the first check valve opens and allows increasing amounts of fluid flow as the first check valve moves toward its fully open position;
a second check valve disposed in the second inlet port, the second check valve having a valve body movable between a closed position and a fully open position, means for reverse biasing the second check valve to its closed position against the direction of forward fluid flow into the second inlet so that under conditions of insufficient forward fluid flow, no fluid flow, or reverse fluid flow at the second check valve, the second check valve closes, and under conditions of increasing forward fluid pressure at the second inlet port, the second check valve opens and allows increasing amounts of fluid flow as the second check valve moves toward its fully open position;
a slider including a first end portion and a second end portion slidably disposed in the first inlet port and in the second inlet port, respectively, the end portions of the slider being configured to stop the first and second check valves and thereby limit the extent to which the first and second check valves can open, whereby the amount of maximum forward fluid flow through each check valve may be controlled; and
an actuator connected to the slider to permit movement of the slider to a desired position relative to the first and second check valves.

* * * * *